US006429893B1

United States Patent
Xin

(12) United States Patent
(10) Patent No.: US 6,429,893 B1
(45) Date of Patent: Aug. 6, 2002

(54) SECURITY SYSTEM

(76) Inventor: Alfred X. Xin, 2480 Fairview Ave. #301, Cincinnati, OH (US) 45219

( * ) Notice: Subject to any disclaimer, the term of this patent is extended or adjusted under 35 U.S.C. 154(b) by 0 days.

(21) Appl. No.: 09/090,501

(22) Filed: Jun. 4, 1998

(51) Int. Cl.[7] .................................................. H04N 7/18
(52) U.S. Cl. ..................................... 348/155; 348/156
(58) Field of Search ................................. 348/155, 152, 348/153, 154, 156; H04N 7/18

(56) References Cited

U.S. PATENT DOCUMENTS

| | | | | |
|---|---|---|---|---|
| 4,524,384 A | * | 6/1985 | Lefkowitz et al. | 348/156 |
| 4,843,461 A | * | 6/1989 | Tatsumi et al. | 348/156 |
| 5,428,388 A | * | 6/1995 | Bauer et al. | 348/155 |
| 6,097,429 A | * | 8/2000 | Seeley et al. | 348/154 |

* cited by examiner

Primary Examiner—Howard Britton

(57) ABSTRACT

A new security system for monitoring and recording activity within the range of a proximity detector is disclosed. The security system also enables an occupant of a house, building or other structure to communicate orally with a person who approaches a door or other threshold either through means disposed at the door or other threshold or remotely. A remote unit allows a person to monitor the activity at the door or other threshold remotely as well as to play back recorded activity. The inventive device includes a video camera for generating a video signal, a video monitor operably coupled to the video camera, a proximity detector for generating a first signal representative of motion proximate the video camera, a microcontroller operably coupled to the proximity detector wherein the microcontroller is further operably coupled to the video camera and to the video monitor through a video recording and playback device and wherein the microcontroller further includes firmware for activating the video camera and the video recording and playback device in response to the first signal.

20 Claims, 6 Drawing Sheets

SECURITY SYSTEM

BACKGROUND OF THE INVENTION

1. Field of the Invention

The present invention relates to security systems and more particularly pertains to a new security system for monitoring and recording activity within the range of a proximity detector and for providing remote control of the security system.

2. Description of the Prior Art

The use of security systems is known in the prior art. More specifically, security systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art security systems include U.S. Pat. Nos. 4,843,461; 4,355,329; U.S. Pat. No. Des. 354,973; U.S. Pat. Nos. 4,524,384; and 4,581,634.

While these devices fulfill their respective, particular objectives and requirements, the aforementioned patents do not disclose a new security system. The inventive device includes a video camera for generating a video signal, a means for displaying video signals operably coupled to the video camera, a means for detecting motion such as a proximity detector for generating a first signal representative of motion proximate the video camera, a microcontroller operably coupled to the means for detecting motion wherein the microcontroller is further operably coupled to the video camera and to the means for displaying video signals through a means for recording and playing back video signals and wherein the microcontroller further comprises a means for activating the video camera and the means for recording and playing back video signals in response to the first signal.

In these respects, the security system according to the present invention substantially departs from the conventional concepts and designs of the prior art, and in so doing provides an apparatus primarily developed for the purpose of monitoring and recording activity within the range of a proximity detector and for providing remote control of the security system. The security system also enables the occupant of a house, building or other structure to communicate orally with a person who approaches a door or other threshold either through means disposed at the door or other threshold or remotely. A remote unit also allows a person to monitor the activity at the door or other threshold remotely as well as to play back recorded activity.

SUMMARY OF THE INVENTION

In view of the foregoing disadvantages inherent in the known types of security systems now present in the prior art, the present invention provides a new security system construction wherein the same can be utilized for monitoring and recording activity within the range of a proximity detector and for providing remote control of the security system.

The general purpose of the present invention, which will be described subsequently in greater detail, is to provide a new security system apparatus and method which has many of the advantages of the security systems mentioned heretofore and many novel features that result in a new security system which is not anticipated, rendered obvious, suggested, or even implied by any of the prior art security systems, either alone or in any combination thereof.

To attain this, the present invention generally comprises a video camera for generating a video signal, a means for displaying video signals operably coupled to the video camera, a means for detecting motion such as a proximity detector for generating a first signal representative of motion proximate the video camera, a microcontroller operably coupled to the means for detecting motion wherein the microcontroller is further operably coupled to the video camera and to the means for displaying video signals through a means for recording and playing back video signals and wherein the microcontroller further comprises a means for activating the video camera and the means for recording and playing back video signals in response to the first signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new security system apparatus and method which has many of the advantages of the security systems mentioned heretofore and many novel features that result in a new security system which is not anticipated, rendered obvious, suggested, or even implied by any of the prior art security systems, either alone or in any combination thereof.

It is another object of the present invention to provide a new security system which may be easily and efficiently manufactured and marketed.

It is a further object of the present invention to provide a new security system which is of a durable and reliable construction.

An even further object of the present invention is to provide a new security system which is susceptible of a low cost of manufacture with regard to both materials and labor, and which accordingly is then susceptible of low prices of sale to the consuming public, thereby making such security system economically available to the buying public.

Still yet another object of the present invention is to provide a new security system which provides in the apparatuses and methods of the prior art some of the advantages thereof, while simultaneously overcoming some of the disadvantages normally associated therewith.

Still another object of the present invention is to provide a new security system for monitoring and recording activity within the range of a proximity detector and for providing remote control of the security system.

Yet another object of the present invention is to provide a new security system which includes a video camera for generating a video signal, a means for displaying video signals operably coupled to the video camera, a means for detecting motion such as a proximity detector for generating a first signal representative of motion proximate the video camera, a microcontroller operably coupled to the means for detecting motion wherein the microcontroller is further operably coupled to the video camera and to the means for displaying video signals through a means for recording and playing back video signals and wherein the microcontroller further comprises a means for activating the video camera and the means for recording and playing back video signals in response to the first signal.

Still yet another object of the present invention is to provide a new security system that enables an occupant of a house, building or other structure to communicate orally with a person who approaches a door or other threshold either through means disposed at the door or other threshold or remotely.

Even still another object of the present invention is to provide a new security system that includes remote unit that allows a person to monitor the activity at the door or other threshold remotely as well as to play back recorded activity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new security system embodying the principles and concepts of the present invention will be described.

Figure 1:
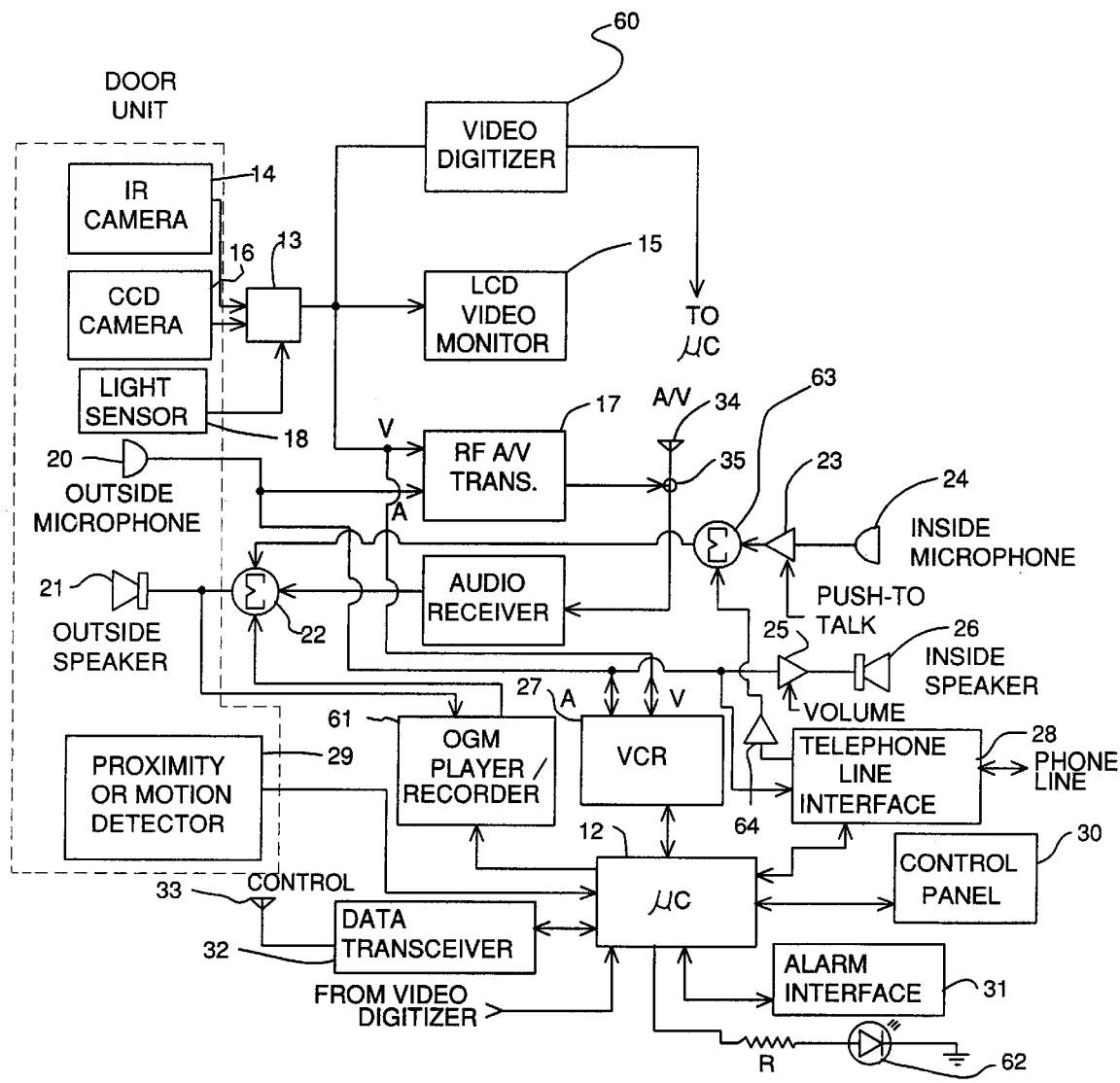
FIG. 1 is a schematic view of the door unit o the present invention.

With reference to FIG. 1 there is schematically shown the door unit including a video camera 16 for generating a video signal. The video camera 16 is preferably a charge coupled device video camera of the kind well know in the art. The video camera 16 is shown operably coupled to a means for displaying video signals 15 through a video switch 13, the function of which will be described further hereinafter. The means for displaying video signals 15 is preferably a liquid crystal display selected for space economy.

The video camera 16 is preferably mounted within a door 80 or other threshold of a structure such as a residence or office in such manner so as not to be prone to shaking and further in such manner that the lens 101 of the video camera 16 faces the outside of the structure and thereby is positioned to capture activity outside the door 80 or other threshold. The means for displaying video signals 15 is preferably mounted upon an inside surface of a wall or other structure adjacent the door 80 or other threshold. In this manner a person inside the structure can view the activity outside the door without endangering themselves by being positioned in front of the door 80, as would be the situation if the person were using a peep hole.

With continued reference to FIG. 1, a means for detecting motion 29, such as a proximity detector or motion detector, is shown operably coupled to a microcontroller 12. The means for detecting motion 29 is designed for generating a first signal representative of motion proximate the video camera 16. The microcontroller 12 is further shown operatively coupled to the video camera 16 and to the means for displaying video signals 15 through a means for recording and playing back video signals 27. The means for recording and playing back video signals 27 is preferably a video cassette recorder of the type well know in the art. The microcontroller 12 includes means for activating the video camera 16 and the means for recording and playing back video signals 27 in response to the first signal.

As is well known in the art, a video cassette recorder includes a means for simultaneously recording audio signals. An outside microphone 20 is shown operably coupled to the video cassette recorder 27 and is preferably disposed proximate the video camera 16 on an outside surface of the door 80. The outside microphone 20 generates a first audio signal which is recorded by the video cassette recorder 27 upon the activation of the video cassette recorder 27.

An inside speaker 26 is shown and is preferably disposed proximate the means for displaying video signals 15. The inside speaker 26 is shown operably coupled to the outside microphone 20 through a first amplifier 25 having a volume control. The first amplifier 25 receives the first audio signal and generates a first amplifier output signal which is received by the inside speaker 26. In this manner a person outside may communicate with the person inside the structure.

An inside microphone 24 is shown and is preferably disposed proximate the means for displaying video signals 15. The inside microphone 24 is shown operably coupled to audio mixers 22 and 63 through a second amplifier 23. The inside microphone 24 generates a second audio signal which is received by the second amplifier 25. The second amplifier 25 generates a second amplifier output signal which is coupled to the audio mixers 63 and 22. The audio mixers 63 and 22 passes the second amplifier output signal to an outside speaker 21. In this manner the person inside the structure can communicate with a person outside the structure.

With continued reference to FIG. 1 there is shown a radio frequency (RF) audio/video transmitter operably coupled to the microcontroller 12 through the means for recording and playing back video signals 27. The RF audio/video transmitter 17 receives the video signal and the first audio signal and generates an audio/video signal which is transmissible through a first antenna 34 operably coupled to the RF audio/video transmitter 17 through a first duplexer 35.

The microcontroller 12 is further shown having an alarm interface 31 operably coupled thereto. The microcontroller 12 preferably includes firmware implementing a means for generating an alarm signal for activating an alarm means. Also shown operably coupled to the microcontroller 12 is a control panel 30. The microcontroller 12 includes means for programmably controlling the various capabilities of the means for recording and playing back video signals 27. Further the microcontroller 12 is programmable to accomplish functions as described hereinafter. The control panel 30 provides a means for a user interface to the microcontroller 12.

A telephone line interface 28 is also shown operably coupled to the microcontroller 12. The telephone line interface 28 essentially comprises a modem, a relay, and a dialer. The microcontroller 12 preferably includes firmware for generating a telephone signal capable of dialing a telephone and for sending data messages. The microcontroller 12 is further shown operably coupled to a video digitizer 60. The video digitizer 60 comprises essentially an analog to digital converter having a memory for storing frames of data representative of the video images captured by the video camera 16 and the infrared camera 14 described hereinbelow. The microcontroller 12 is programmable to either send data messages either by means of a data transceiver 32 operably coupled thereto or by means of the telephone line interface 28.

An infrared video camera 14 is also shown in FIG. 1. The infrared video camera 14 generates a third video signal and is mountable within the door in such manner that a lens thereof faces the outside of the structure. The infrared video camera 14 is shown operably coupled to the means for displaying video signals 15 through the video switch 13. The video switch 13 is responsive to a light sensor 18 shown operably coupled thereto. In the event of low light, the video switch 13 connects the infrared video camera 14 and disconnects the video camera 16.

With continued reference to FIG. 1 an outgoing message player/recorder 81 is shown operably coupled to the microcontroller 12 and to the outside speaker 21. When the proximity detector 29 generates the first signal, the microcontroller 12 signals the outgoing message player/recorder 81 to play a pre-recorded message.

A light emitting diode 62 is shown operably coupled to the microcontroller 12 through a resistor R. The light emitting diode 62 is activated upon the generation of the first signal by the proximity detector 29.

Figure 2:
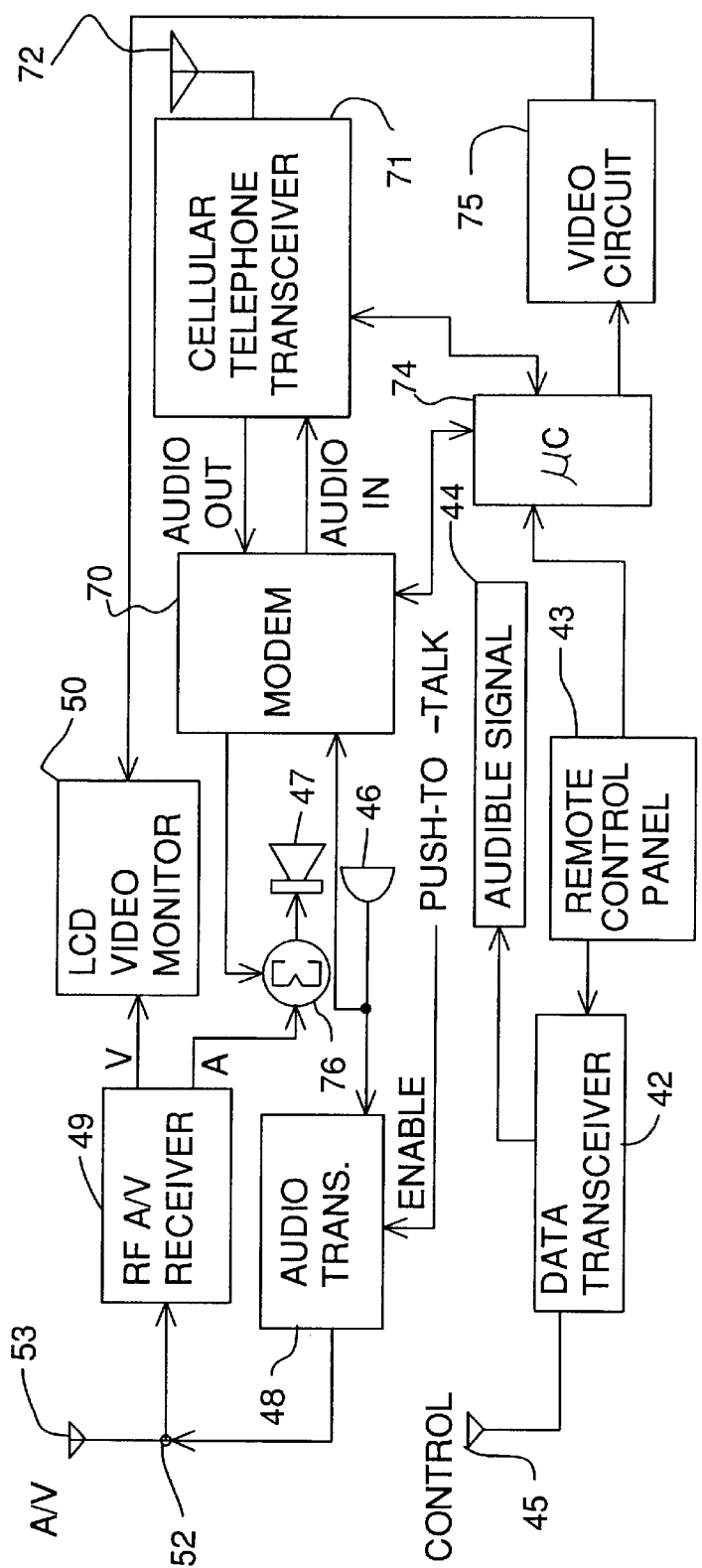
FIG. 2 is a schematic view of the remote unit of present invention.

With reference to FIG. 2 there is shown the remote unit 40. The remote unit 40 includes a remote microphone 46 operably coupled to an audio transmitter 48. The audio transmitter 48 generates a remote audio signal which is transmissible through a second antenna 53. The remote audio signal is receivable by the first antenna 34 which is operably coupled to an audio receiver 36 through the first duplexer 35. The audio receiver 36 is shown operably coupled to the mixer 22. In this manner the person in possession of the remote unit 40 can communicate to the person outside the structure.

With continued reference to FIG. 2 there is shown a RF audio/video receiver 49 operably coupled to a second means for displaying video signals 50 and a remote speaker 47. The RF audio/video receiver 49 receives the audio video signal transmitted by the RF audio/video transmitter 17 and generates a third audio signal receivable by the remote speaker 47 and a second video signal receivable by the second means for displaying video signals 50, which preferably includes a liquid crystal display.

The remote unit 40 further includes a first data transceiver 42 operably coupled to a means for generating data, such as, control panel 43. The data transceiver 42 generates a data signal transmissible through a first control antenna 45 operably coupled thereto. The data signal is receivable by a second control antenna 33 which is shown operably coupled to a second data transceiver 32 operably coupled to the microcontroller 12. By means of the control panel 43 a user can access the microcontroller 12 to implement functions such as transmitting the video/audio signal, generating the alarm signal, and the functions of the video cassette recorder 27.

With continued reference to FIG. 2 there is shown a means for generating an audible signal 44 operably coupled to the first data transceiver 42. The means for generating an audible signal 44 preferably includes an audible alarm of the type well know in the art.

A cellular telephone transceiver 71 is shown operably coupled to a second microcontroller 74 through a modem 70. In the case where the remote unit 40 is disposed away from the door unit, the microcontroller 12 is enabled to transmit the video frames generated by the video digitizer 60 through the telephone line interface 28. When the modem 70 senses a certain carrier frequency (2600 Hz or higher) and amplitude, the audio functions of the remote unit 40 are muted by the second microcontroller 74 and the video frame is demodulated by the modem 70. The second means for displaying video signals 50 is shown operably coupled to the second microcontroller 74 through a video circuit 75. The video circuit 75 essentially comprises a video controller chip including a digital to analog converter and memory to hold the video frames. The second microcontroller 74 includes firmware to enable a user to request a new video frame which is then displayed by the second means for displaying video signals 50.

Figure 3:
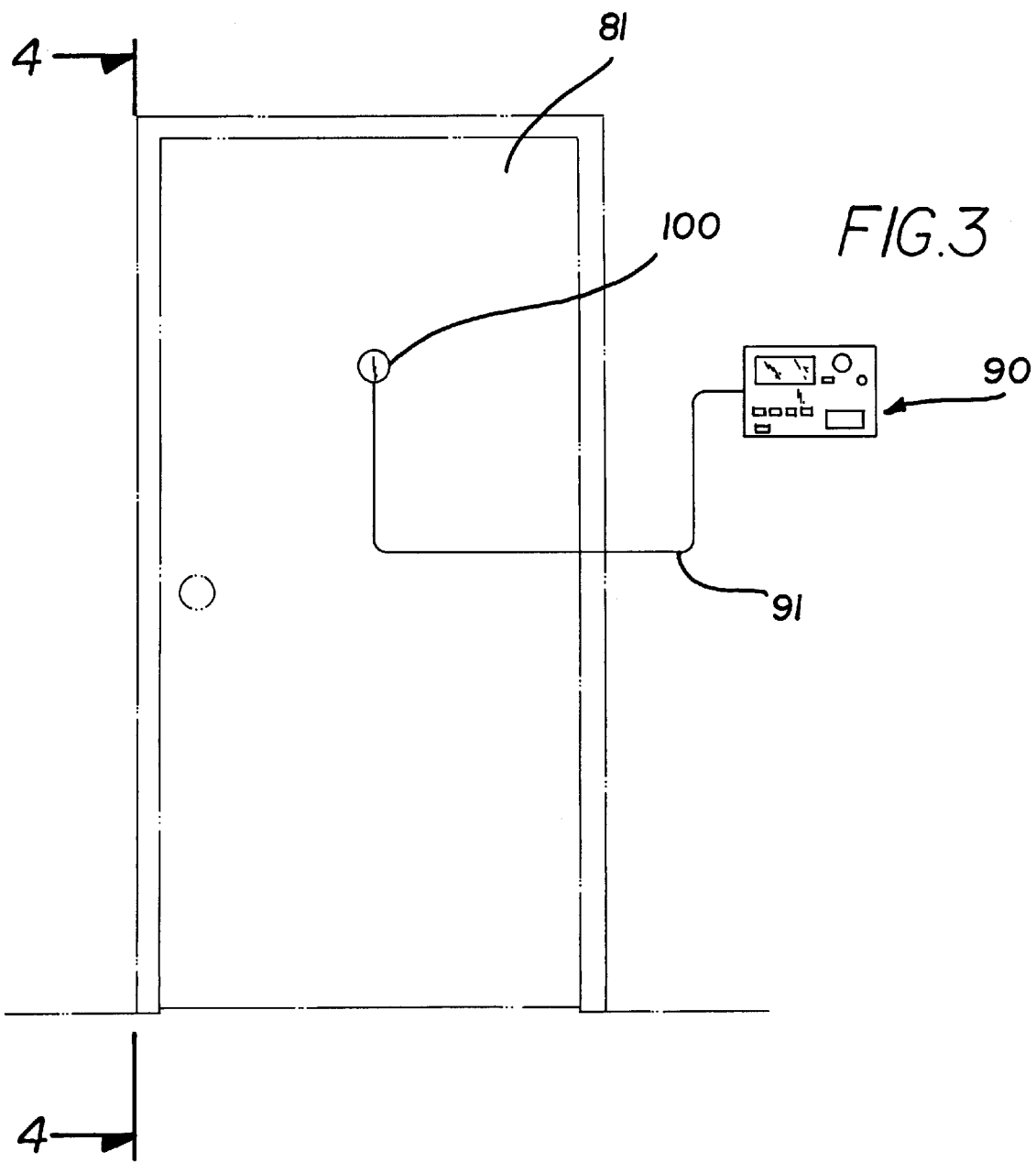
FIG. 3 is a front elevational view of a door and adjoining wall having the new security system installed thereon.
Figure 4:
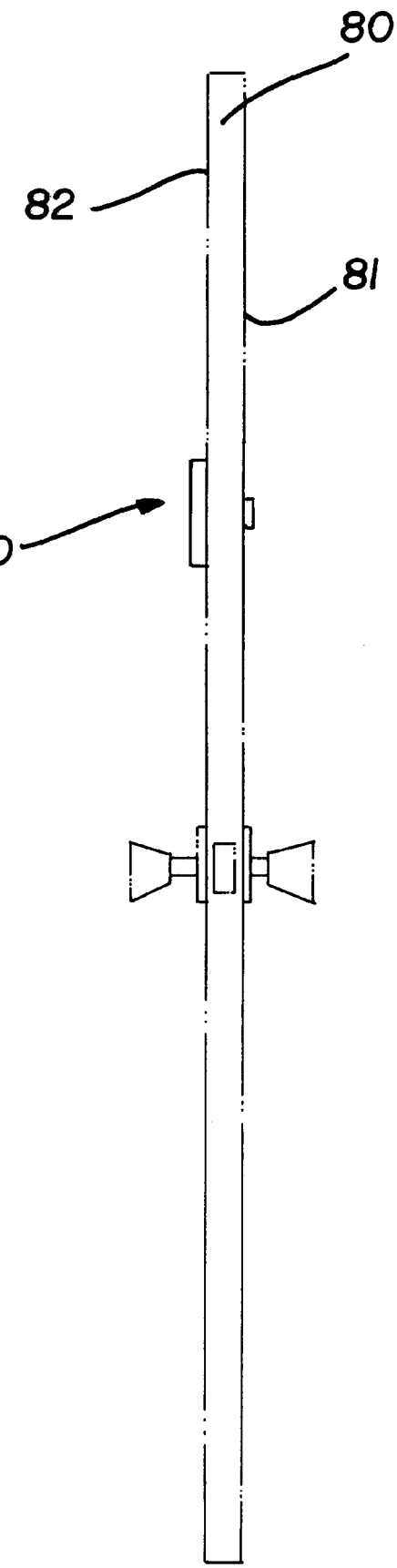
FIG. 4 is a side elevational view of the door having the new security system installed thereon.
Figure 6:
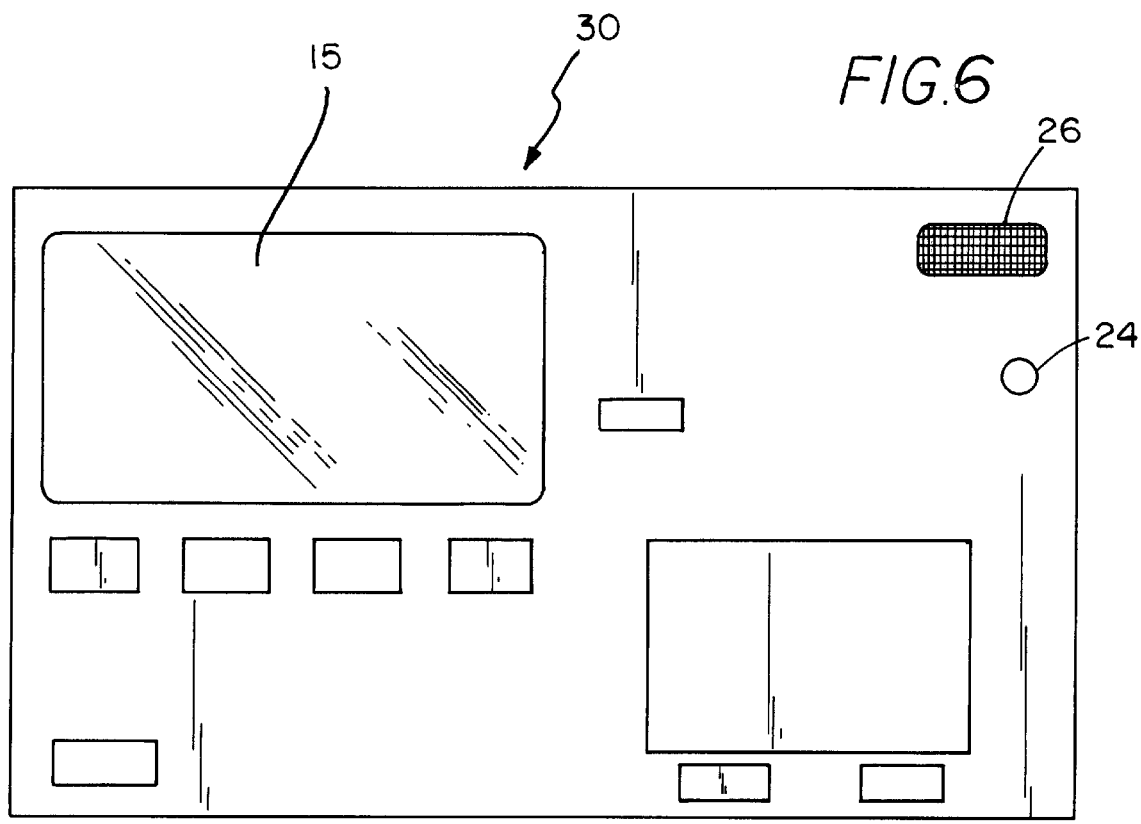
FIG. 6 is a front elevational view of the control panel of the present invention.

With reference to FIGS. 3 and 4 there is shown a door 80 including an inside surface 81 and an outside surface 82. The door unit 100 is shown disposed in the door 80 at approximately eye level. A flexible cable 81 connects the door unit 100 to the control panel 30 which is shown in FIG. 6. The control panel 30 is shown including an LCD video monitor 15 and a plurality of buttons operable to program the microcontroller 12. Also shown are the inside speaker 26 and the inside microphone 24.

Figure 5:
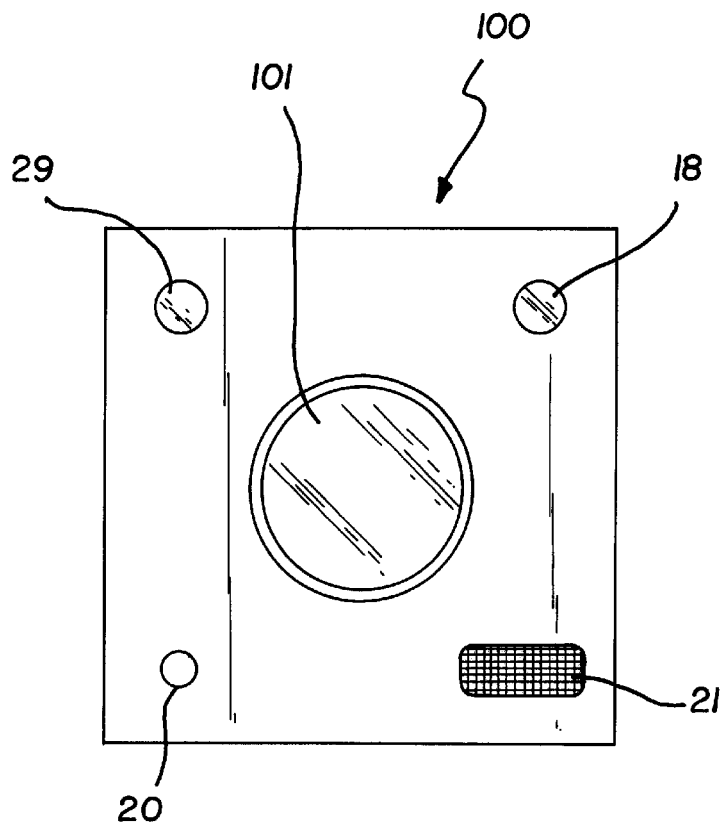
FIG. 5 is front elevational view of the outside portion of the door unit of the present invention.

With reference to FIG. 5 an outside portion 102 of the door unit 100 is shown including the video camera lens 101, the outside microphone 20, the outside speaker 21, the motion detector 29 and the light sensor 18.

Figure 7:
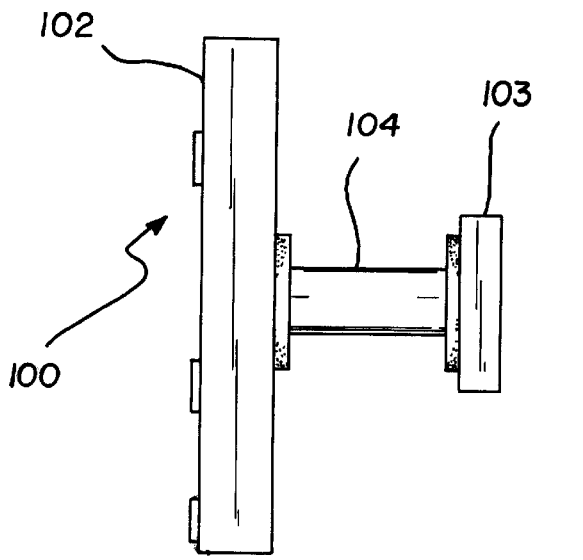
FIG. 7 is side elevational view of the door unit.

With reference to FIG. 7 there is shown the door unit 100 including the outside portion 102 connected to a locking portion 103 by means of an intermediate portion 104 which is closely received in an aperture formed in the door 80. The locking portion 103 is designed to lock the outside portion 102 is place.

Figure 8:
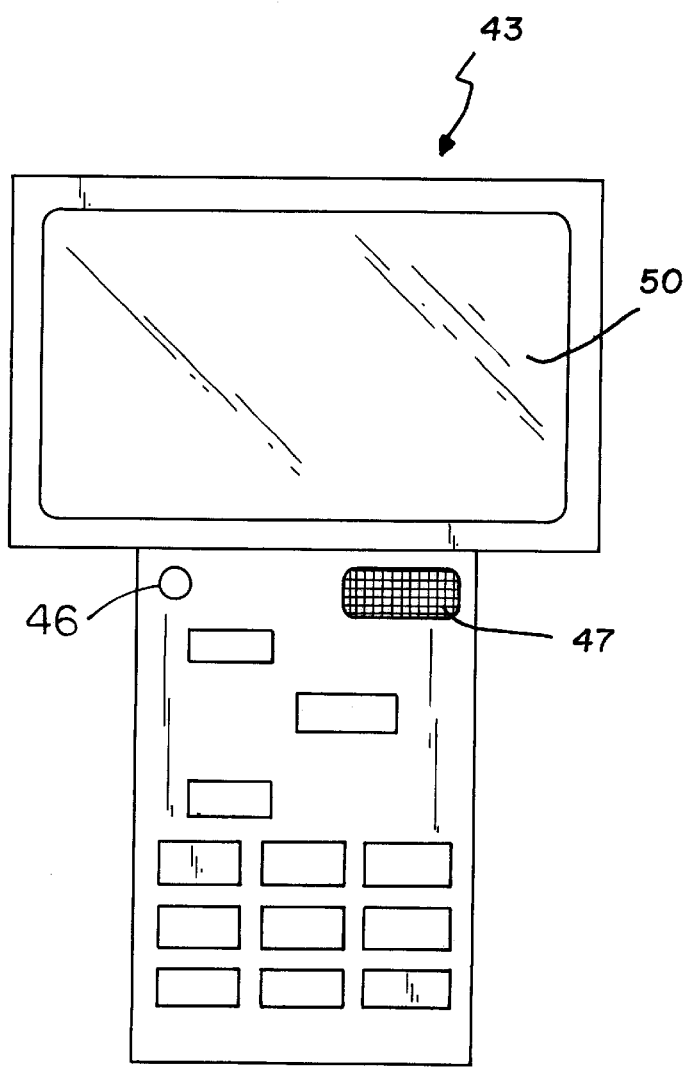
FIG. 8 is a front elevational view of the remote control unit of the present invention.

With reference to FIG. 8 the remote control panel 43 is shown including the second LCD video monitor 50. A plurality of buttons operable to program and control the second microcontroller 74. The remote speaker 47 and the remote microphone 46 are also shown.

As to a discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A security system comprising:
   a video camera for generating a video signal, the video camera being operably coupled to a first means for displaying video signals;
   a means for detecting motion, the means for detecting motion being for generating a first signal representative of motion proximate the video camera;
   a microcontroller operably coupled to the means for detecting motion, the microcontroller further being operably coupled to the video camera and the first means for displaying video signals through a means for recording and playing back video signals; and
   wherein the microcontroller further comprises a means for activating the video camera and the means for recording and playing back video signals in response to the first signal.

2. The security system of claim 1, wherein the video camera is mountable within a door of a structure in such manner that a lens thereof faces the outside of the structure and wherein the first means for displaying video signals is mountable upon an inside surface of a wall adjacent the door.

3. The security system of claim 2, wherein the means for recording and playing back video signals further comprise a means for simultaneously recording a first audio signal, the first audio signal being generated by an outside microphone operably coupled thereto and disposed proximate the video camera on an outside surface of the door.

4. The security system of claim 3 further comprising an inside speaker disposed proximate the first means for displaying video signals and operably coupled to the outside microphone through a first amplifier, the first amplifier being for receiving the first audio signal and generating a first amplifier output signal, the first amplifier output signal being receivable by the inside speaker.

5. The security system of claim 3 further comprising an inside microphone for generating a second audio signal, the inside microphone being disposed proximate the first means for displaying video signals and operably coupled to an audio mixer through a second amplifier, the second amplifier being for receiving the second audio signal and generating a second amplifier output signal, the second amplifier output signal being receivable by the audio mixer, the audio mixer being operably coupled to an outside speaker disposed proximate the outside microphone.

6. The security system of claim 3 further comprising a radio frequency audio/video transmitter operably coupled to the microcontroller through the means for recording and playing back video signals, the radio frequency audio/video transmitter being for receiving the video signal and the first audio signal and generating an audio/video signal, the audio/video signal being transmissible through a first antenna operably coupled to the radio frequency audio/video transmitter through a first duplexer.

7. The security system of claim 1, wherein the microcontroller further comprises a means for generating an alarm signal.

8. The security system of claim 1, wherein the microcontroller further comprises a means for programmably controlling the means for recording and playing back video signals.

9. The security system of claim 1, wherein the microcontroller further comprises a means for generating a telephone signals.

10. The security system of claim 3, wherein the means for recording and playing back video signals further comprise a video cassette recorder.

11. The security system of claim 1, wherein the first means for displaying video signals further comprise a liquid crystal display.

12. The security system of claim 6 further comprising a remote unit having a remote microphone operably coupled to an audio transmitter, the audio transmitter being for generating a remote audio signal, the remote audio signal being transmissible through a second antenna operably coupled to the audio transmitter through a second duplexer and being receivable by the first antenna, the first antenna being operably coupled to an audio receiver through the first duplexer, the audio receiver being operably coupled to the mixer.

13. The security system of claim 12, wherein the remote unit further comprises a radio frequency audio/video receiver operably coupled to a second means for displaying video signals and to a remote speaker, the radio frequency audio/video receiver being for receiving the audio/video signal and generating a third audio signal receivable by the remote speaker and a second video signal receivable by the second means for displaying video signals.

14. The security system of claim 13, wherein the remote unit further comprises a first data transceiver operably coupled to a means for generating data, the first data transceiver being for generating a data signal transmissible through a first control antenna operably coupled thereto, the data signal further being receivable by a second control antenna operably coupled to a second data transceiver operably coupled to the microcontroller.

15. The security system of claim 12, wherein the remote unit further comprises a means for generating an audible signal operably coupled to the first data transceiver.

16. The security system of claim 13, wherein the second means for displaying video signals further comprises a liquid crystal display.

17. The security system of claim 2 further comprising an infrared video camera for generating a third video signal, the infrared video camera being mountable within the door in such manner that a lens thereof faces the outside of the structure, the infrared video camera being operably coupled to the means for displaying video signals through a video switch, the video switch being responsive to a light sensor operably coupled thereto.

18. The security system of claim 14 further comprising a telephone line interface operably coupled to the microcontroller, a video digitizer operably coupled to the microcontroller, the video digitizer being operable to digitize and store the video signal into video frames, a cellular telephone transceiver disposed in the remote unit, the cellular telephone transceiver being operable to receive the video frames and the audio signal, the cellular telephone transceiver further being operably coupled to a second microcontroller disposed in the remote unit, a modem operably coupled to the second microcontroller and to the cellular telephone transceiver, and a video circuit operably coupled to the second microcontroller, the video circuit being operable to hold a video frame for transmission to the second means for displaying video signals, the second microcontroller further being operably coupled to the means for generating data.

19. The security system of claim 5 further comprising a means for recording and playing back a pre-recorded message, the means for recording and playing back a pre-recorded message being operably disposed between the microcontroller and the audio mixer.

20. The security system of claim 1 further comprising a light emitting diode operable coupled to the microcontroller through a resistor, the microcontroller energizing the light emitting diode in response to the first signal.

* * * * *